United States Patent
Durden et al.

(10) Patent No.: US 8,640,158 B2
(45) Date of Patent: *Jan. 28, 2014

(54) SYSTEMS, METHODS, AND PRODUCTS FOR PRESENTING CONTENT

(75) Inventors: George A. Durden, Alpharetta, GA (US); John R. Stefanik, Atlanta, GA (US); Scott R. Swix, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/227,526

(22) Filed: Sep. 8, 2011

(65) Prior Publication Data

US 2011/0321080 A1    Dec. 29, 2011

Related U.S. Application Data

(63) Continuation of application No. 12/122,853, filed on May 19, 2008, now Pat. No. 8,046,788, which is a continuation of application No. 09/751,702, filed on Dec. 29, 2000, now Pat. No. 7,380,258.

(60) Provisional application No. 60/213,058, filed on Jun. 21, 2000, provisional application No. 60/214,529, filed on Jun. 27, 2000.

(51) Int. Cl.
*H04N 7/16* (2011.01)
*H04K 1/00* (2006.01)
*H04N 5/93* (2006.01)

(52) U.S. Cl.
USPC .............................. 725/28; 725/25; 725/135

(58) Field of Classification Search
USPC ...................... 725/25, 32, 35, 46, 28, 60, 135
See application file for complete search history.

(56) References Cited

U.S. PATENT DOCUMENTS

| | | | |
|---|---|---|---|
| 4,930,158 A | 5/1990 | Vogel | |
| 4,930,160 A | 5/1990 | Vogel | |
| 5,191,645 A | 3/1993 | Carlucci et al. | |
| 5,195,135 A | 3/1993 | Palmer | |
| 5,398,070 A | 3/1995 | Lee | |

(Continued)

FOREIGN PATENT DOCUMENTS

| | | |
|---|---|---|
| EP | 0 508 939 | 10/1992 |
| EP | 0 952 734 | 10/1999 |

(Continued)

OTHER PUBLICATIONS

Press Release; Excite, Inc.; EXCITE Couch Potatoes Into Real-Time Online Judges With National Television Event; Mar. 29, 1998 (2 pages).

(Continued)

*Primary Examiner* — Pankaj Kumar
*Assistant Examiner* — Reuben M Brown
(74) *Attorney, Agent, or Firm* — Scott P. Zimmerman, PLLC (57) ABSTRACT

Methods, systems, and products modify and/or block content. A program is received, along with a default rating of the program and dynamic ratings of portions of the program. A preference is received from memory to at least one of block and modify the program. When a dynamic rating is missing for a portion of the program, then revert to the default rating and block the portion of the program from presentation.

20 Claims, 7 Drawing Sheets

(56) References Cited

U.S. PATENT DOCUMENTS

| | | | |
|---|---|---|---|
| 5,465,384 A | 11/1995 | Bejan et al. | |
| 5,481,296 A | 1/1996 | Cragun et al. | |
| 5,485,518 A | 1/1996 | Hunter et al. | |
| 5,530,469 A | 6/1996 | Garfinkle | |
| 5,534,911 A | 7/1996 | Levitan | |
| 5,534,913 A | 7/1996 | Majeti et al. | |
| 5,559,949 A | 9/1996 | Reimer et al. | |
| 5,570,415 A | 10/1996 | Stretton et al. | |
| 5,619,247 A | 4/1997 | Russo | |
| 5,619,251 A | 4/1997 | Kuroiwa et al. | |
| 5,668,591 A | 9/1997 | Shintani | |
| 5,671,267 A | 9/1997 | August et al. | |
| 5,694,162 A | 12/1997 | Freeny, Jr. | |
| 5,699,107 A | 12/1997 | Lawler et al. | |
| 5,710,815 A * | 1/1998 | Ming et al. | 380/241 |
| 5,737,552 A | 4/1998 | Lavallee et al. | |
| 5,774,170 A | 6/1998 | Hite et al. | |
| 5,778,135 A | 7/1998 | Ottesen et al. | |
| 5,793,438 A | 8/1998 | Bedard | |
| 5,801,747 A | 9/1998 | Bedard | |
| 5,812,123 A | 9/1998 | Rowe et al. | |
| 5,818,935 A | 10/1998 | Maa | |
| 5,828,402 A | 10/1998 | Collings | |
| 5,850,218 A | 12/1998 | LaJoie et al. | |
| 5,900,915 A | 5/1999 | Morrison | |
| 5,917,481 A | 6/1999 | Rzeszewski | |
| 5,973,683 A | 10/1999 | Cragun et al. | |
| 5,982,363 A | 11/1999 | Naiff | |
| 5,982,445 A | 11/1999 | Eyer et al. | |
| 6,008,802 A | 12/1999 | Iki et al. | |
| 6,009,433 A | 12/1999 | Kurano et al. | |
| 6,016,141 A | 1/2000 | Knudson et al. | |
| 6,020,882 A | 2/2000 | Kinghorn et al. | |
| 6,023,267 A | 2/2000 | Chapuis et al. | |
| 6,025,869 A | 2/2000 | Stas | |
| 6,046,760 A | 4/2000 | Jun | |
| 6,057,872 A | 5/2000 | Candelore | |
| 6,088,007 A | 7/2000 | Shioya | |
| 6,104,423 A * | 8/2000 | Elam | 725/28 |
| 6,122,660 A | 9/2000 | Baransky et al. | |
| 6,240,555 B1 | 5/2001 | Shoff et al. | |
| 6,249,320 B1 | 6/2001 | Schneidewend et al. | |
| 6,263,376 B1 | 7/2001 | Hatch et al. | |
| 6,263,505 B1 | 7/2001 | Walker et al. | |
| 6,312,336 B1 | 11/2001 | Handelman et al. | |
| 6,314,572 B1 | 11/2001 | LaRocca et al. | |
| 6,326,982 B1 | 12/2001 | Wu et al. | |
| 6,415,326 B1 | 7/2002 | Gupta et al. | |
| 6,463,207 B1 | 10/2002 | Abecassis | |
| 6,499,138 B1 | 12/2002 | Swix et al. | |
| 6,519,770 B2 | 2/2003 | Ford | |
| 6,571,392 B1 | 5/2003 | Zigmond et al. | |
| 6,577,350 B1 | 6/2003 | Proehl et al. | |
| 6,597,405 B1 | 7/2003 | Iggulden | |
| 6,601,103 B1 | 7/2003 | Goldschmidt et al. | |
| 6,604,240 B2 | 8/2003 | Ellis et al. | |
| 6,614,987 B1 | 9/2003 | Ismail et al. | |
| 6,665,870 B1 | 12/2003 | Finseth et al. | |
| 6,668,377 B1 | 12/2003 | Dunn | |
| 6,675,384 B1 | 1/2004 | Block et al. | |
| 6,732,367 B1 | 5/2004 | Ellis et al. | |
| 6,782,550 B1 | 8/2004 | Cao | |
| 6,792,618 B1 | 9/2004 | Bendinelli et al. | |
| 6,853,728 B1 | 2/2005 | Kahn et al. | |
| 6,947,966 B1 | 9/2005 | Oko et al. | |
| 7,140,033 B1 | 11/2006 | Durden et al. | |
| 7,200,852 B1 | 4/2007 | Block | |
| 2001/0001159 A1 | 5/2001 | Ford | |
| 2001/0027564 A1 | 10/2001 | Cowan et al. | |
| 2002/0046407 A1 | 4/2002 | Franco | |
| 2002/0056088 A1 | 5/2002 | Silva et al. | |
| 2002/0056129 A1 | 5/2002 | Blackketter et al. | |
| 2002/0073424 A1 | 6/2002 | Ward et al. | |
| 2002/0092017 A1 * | 7/2002 | Klosterman et al. | 725/35 |
| 2002/0184638 A1 | 12/2002 | Agnihotri et al. | |
| 2003/0131356 A1 | 7/2003 | Proehl et al. | |
| 2004/0040034 A1 | 2/2004 | Sullivan et al. | |
| 2005/0047752 A1 | 3/2005 | Wood et al. | |
| 2005/0216936 A1 | 9/2005 | Knudson et al. | |
| 2006/0031883 A1 | 2/2006 | Ellis et al. | |
| 2006/0095937 A1 | 5/2006 | Knudson et al. | |
| 2010/0100909 A1 | 4/2010 | Arsenault et al. | |

FOREIGN PATENT DOCUMENTS

| | | |
|---|---|---|
| WO | WO 97/13368 | 4/1997 |
| WO | WO 98/16062 | 4/1998 |
| WO | WO 98/47286 | 10/1998 |
| WO | WO 99/04561 | 1/1999 |
| WO | WO 00/14954 | 3/2000 |
| WO | WO 00/20976 | 4/2000 |

OTHER PUBLICATIONS

"nfl.com: 1997 regular season to get August start", {online} {retrieved on Oct. 26, 2006} http://web.archive.org/web/19970419062432/www.nfl.com/news/nflnews/0326sked.html (10 pages).

Barkai, David. "An Introduction to Peer-to-Peer Computing". Intel Developer Update Magazine. Intel Corporation. Oct. 2000 (7 pages).

Cahners In-Stat Group Report information, Multimedia Home Networking, IEEE 1394 and the Competition, Dec. 2001.

Kate, Ten W. "Trigg & Link A New Dimension in Television Program Making," Proceedings of the European Conference on Multimedia Applications, Services and Techniques, May 1997, pp. 51-65.

* cited by examiner

TEMPLATE

What content do you wish to block?

☐ Sexual Situations ☐ Violence

☐ Language ☐ Nudity

What ratings do you wish to block?

☐ PG ☐ R

☐ PG-13 ☐ X

Do you wish to substitute available alternative audio tracks?

☐ Yes ☐ No

Video tracks?

☐ Yes ☐ No

Do you wish to enter demographic data for targeted ads?

☐ Yes ☐ No

SYSTEMS, METHODS, AND PRODUCTS FOR PRESENTING CONTENT

CROSS-REFERENCE TO RELATED APPLICATIONS

This application is a continuation of U.S. application Ser. No. 12/122,853, filed May 19, 2008, now issued as U.S. Pat. No. 8,046,788, which is a continuation of U.S. application Ser. No. 09/751,702, filed Dec. 29, 2000, now issued as U.S. Pat. No. 7,380,258, with each application incorporated herein by reference in its entirety.

This application also claims priority to U.S. Provisional Application 60/213,058, filed Jun. 21, 2000 and to U.S. Provisional Application 60/214,529, filed Jun. 27, 2000, with each application incorporated herein by reference in its entirety.

TECHNICAL FIELD

This invention generally relates to the field of programming control systems, and more particularly to systems and methods for allowing users to control and manage programming content. In one implementation, an application residing on a set-top box or other consumer electronic device, such as a television set, uses data synchronized to a program to dynamically block or modify portions of the program's video or audio based on a user's parental control settings.

BACKGROUND OF INVENTION

With the increasing availability of television programming, cable services, Internet programming, and other interactive entertainment services, there is an ever greater need for the ability to control and manage content of programming. Users desire to be able to more easily and effectively choose the types of television programs to which they and/or their children are exposed.

In some existing "parental control systems," such as those associated with V-chip technology or Electronic Program Guides (EPGs), users may block all programs having particular ratings and content attributes. For instance, a user may block all programs having a rating of "TV-MA" (Mature) or all programs having the content attribute for "Violence." When a program with blocked ratings or content attributes appears, both its video and audio are blocked for the entire duration of the program unless the user enters a personal identification number (PIN) to unblock it. With such existing systems, ratings and content attributes are generalized for the entire program and rarely change. As a result, blocking is an "all or nothing" affair because either all of the program is blocked or none of it is blocked. This is a disadvantage if the ratings or content attributes apply to only a small part of the entire program.

For instance, if a program contains a brief scene of nudity and the user blocked all programs with "Nudity," the entire program would be blocked even if the scene in question was only a few seconds in length. There would be no way to selectively block just that portion of the program. A good example of this is the movie "Titanic." After Titanic's release, a small firm began editing from Titanic a love scene between the two main characters. There was an enormous demand for this version of Titanic among parents and other users who did not desire to see that particular scene, but did wish to view the other portions of the movie.

Even if parental control systems could block a portion of the program by briefly changing the program's ratings or content attributes or by changing the data being provided to the V-chip during a program, there would be no way to block just the video or just the audio portion of the program. For instance, if a program contained a few seconds of adult language, the ratings and/or content attributes data would be unable to instruct the parental control system to block only the audio for that period of time. As a result, both video and audio would always be blocked together.

Furthermore, existing parental control systems are also limited to completely disabling the audio or video. In other words, existing parental control systems cannot modify the video or audio in any way. For instance, if a program contains adult language, the ratings/content data cannot instruct the parental control system to switch to an alternative audio track containing a G-rated version of the dialog.

A better approach would be to make the ratings and/or content data vary during the course of the program. An even better approach would be to provide additional data to indicate whether the video, audio, or both video and audio portion of the program should be blocked. Additionally, the data could indicate ways in which to modify the video or audio portion of the program to make it acceptable for the current parental control settings.

SUMMARY OF INVENTION

Certain terms used in this section are described more fully below, particularly in the "Terminology" session. The present invention addresses the problems discussed above by providing systems and methods for allowing users of programs to control and manage the ways in which portions of the programs are presented. In general, this invention provides program users with program data for a program corresponding to discrete portions of the program. The program data comprises (a) program content data, (b) program control data, or (c) both. The content data may consist of rating values associated with categories in a rating system and/or content attribute values indicating the existence of predefined attributes or traits associated with each discrete portion of the program. The program control data comprises information concerning the media component (e.g., audio, video, text, hyperlinks, etc.) to which the rating or content attribute applies. The program control data may also contain control instructions corresponding to the ways in which each portion or media component of the program may be disabled, modified, replaced, and/or edited. These data are delivered to a set top box or other consumer electronics ("CE") device that couples to a display, like a television or monitor.

Users can enter into the CE device a presentation profile, by which a user specifies content the user does not wish to review or wishes to insert over existing content. For instance, the user may select certain types of rating categories and/or content attributes that the user desires not to be presented. Optimally, users may specify a method for disabling, such as deleting, modifying, replacing, or editing, the portions of the program having the undesirable rating and/or content attribute. Based on the program data associated with the program and the information contained in the user's presentation profile, the CE device controls the programming presented for display.

For example, the program data is compared against the presentation profile. When the presentation profile indicates deletion or editing of specific type material, and when the program data indicates the presence of that material in a portion of the programming, that portion of the programming is modified accordingly. If the program data contains a rating and/or content attribute listed in the presentation profile, systems and methods according to the present invention perform any of the following functions: block video, block audio, block video and audio, block only a portion of the audio or video, substitute local audio, substitute local video, substitute alternative audio stream, substitute alternative video channel/stream, substitute alternative video and audio channel/stream, edit content, and/or delete content.

In one implementation, this invention uses streaming data or timestamped data synchronized to a program to provide ratings and/or content attribute information that vary during the program. This data is used by applications residing on a set-top box or other CE device to block or modify portions of a program's video or audio based on the settings selected by the user. In addition to providing varying ratings and/or content attribute information, the data may also include program control data related to what component of the program to block, such as video only, audio only, or both video and audio. Additionally, this data includes instructions on possible ways to modify the content. For example, the data could instruct the application to do such things as switch to an alternate audio track, switch to an alternate video channel, or blackout a certain area of the screen. Alternatively, all of these different capabilities could be entered, enabled or disabled by the user via the presentation profile or a control.

A further application of this invention is for Digital Video Recorders (DVRs) or digital disk recorders. When outfitted with this invention, DVRs or the like are capable of dynamically editing and deleting scenes based on the program data and the presentation profile created by a user.

This invention aims to achieve one, combinations, or all of the following objectives:

- To formulate program content data, associated with discrete portions of programming, which contains information related to programming content;
- To formulate program control data, associated with discrete portions of programming, which contains information related to how programming may be edited, deleted, modified, substituted, or otherwise altered;
- To provide, via a set-top box or other appropriate consumer electronic device, users with the content data, control data, or both;
- To enable programming users to define those types of programming and portions of programming they desire not to be presented; and
- To enable users to change undesired types of programming and portions of programming by dialing, modifying, substituting, deleting, or editing such programming or portions thereof.

Other objects, advantages and features of this invention will be apparent from review of the remainder of this document, including the drawings.

DETAILED DESCRIPTION

I. Terminology

Before further describing a particular implementation of the present invention that is shown in the drawings, the following terms are explained, although more thorough understanding of the terms can be reached by resorting to this entire document. These term explanations are not intended to be conclusive, as technology will change and skilled persons will recognize other ways to implement the same functionality.

"Communications network" includes any network or infrastructure that supports communications between multiple devices, including broadband distribution networks, public or private packet-switched or other data networks, including the Internet, or circuit-switched networks such as the public switched telephone network and wireless networks.

"Consumer electronics device" or "CE device" is any electronic device or combination of devices capable of receiving, displaying, playing, presenting, recording, deleting, editing, substituting, or disabling audio and/or video content. Exemplary CE devices include: televisions, personal computers, cable set-top boxes, video cassette recorders, digital video recorders, digital video disc players, compact disc players, and personal computers.

"Content data" is any information corresponding to at least a portion of a program and related to the content of the program, including content ratings and content attributes, traits, or characteristics.

"Control data" is any information corresponding to at least a portion of a program and related to the manner in which the portion may be disabled, modified, replaced, deleted, edited, or otherwise modified by a CE device, set top box or the like.

"Presentation control system" is any device or combination of devices having (1) a receiver adapted to receive a program signal and (2) a processor for controlling the program to be displayed on a consumer electronic device, including a set-top box, television, or personal computer.

"Program" or "Programming" is any electronic presentation of information, such as text, audio, video, graphics, or any other form of multimedia, over a communications network. Exemplary programming includes: Internet programming, television broadcasts, cable television programming, pay-per-view programming, video-on-demand, interactive television programming, satellite programming, and multimedia presentations.

"Program data" means content or control data or other data associated with or describing the content or manner of presentation of programming.

"Presentation preferences" refers to information related to the types of program content that either a person desires not to view or that a person desires to replace and/or the manner in which programs and portions of programs having this type of content may be disabled, modified, replaced, deleted, edited, or otherwise modified by a CE device.

"Service provider" is any entity that delivers programs to a program viewer, including cable providers, television broadcasters, satellite providers, and entities supporting Internet World Wide Web ("Web") sites.

II. System Overview

Figure 1:
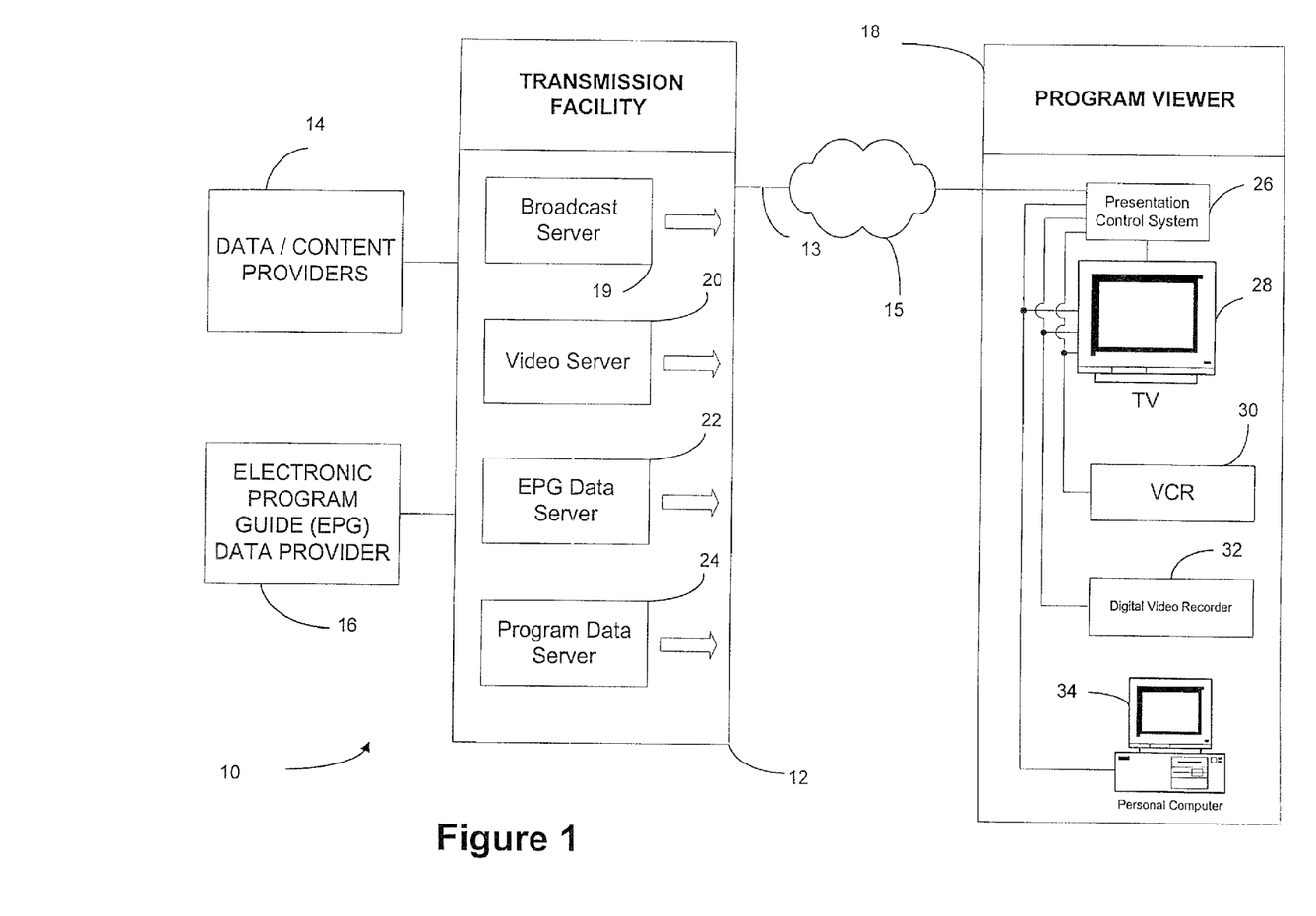
FIG. 1 is a diagram illustrating an embodiment of a system according to the present invention.

FIG. 1 shows components of a system 10 for implementing an embodiment of this invention. A transmission facility 12, such as a cable head end, is operated by a service provider and receives various types of programming from data/content providers 14, which may provide traditional broadcast or cable television programming, video services such as pay-per-view, near video-on-demand, video-on-demand, promotional channels, or interactive television services. Exemplary data/content providers 14 include BellSouth, (the assignee of this invention), Disney, Time-Warner, DirectTV, etc. In connection with the provision of some of these services, transmission facility 12 may also receive electronic program guide (EPG) data from data providers 16. A particular content provider 14, such as Disney, may also provide EPG data, thus acting as an EPG data provider 16. Also, EPG data provider 16 may include companies that specialize in EPG data, such as Gemstar, United Video, Starsight, etc.

Transmission facility 12 processes the programming furnished by data/content providers 14 and 16 and provides to program viewers 18 a signal 13 over a communications network 15, which may be a broadband distribution network, a public or private packet-switched or other data networks (including the Internet), circuit switched networks such as the public switched telephone network, wireless networks, or any other desired communications network. Transmission facility 12 may comprise a plurality of servers, such as broadcast server 19, video server 20, EPG data server 22, and program data server 24, for providing multiple types of programming and related data via signal 13. Program viewers 18 receive programming at a presentation control system 26, which may be a standard set top box, a properly programmed processor, coupled to a display, a consumer electronic device, or any other device adapted to couple to communications network 15. Control system 26 includes, or couples to, a receiver (such as receiver 56 shown in FIG. 5) for receiving and decoding signal 13 and a processor for controlling the program content to be displayed on devices such as television 28, personal computer 34 or any other suitable display device.

Presentation control system 26 may be a stand alone system that communicates with a display device and other consumer electronic devices or may be combined with the display device and/or any other suitable CE device in one device. In accordance with the present invention, presentation control system 26 also may receive a presentation profile 35 from program viewers 18. Based on presentation profile 35 and program data 36 received from transmission facility 12, the presentation control system 26 manages and controls the presentation of program content by interacting with video cassette recorder (VCR) 30, digital video recorder (DVR) 32, personal computer 34, or any other suitable CE device.

Figure 2:
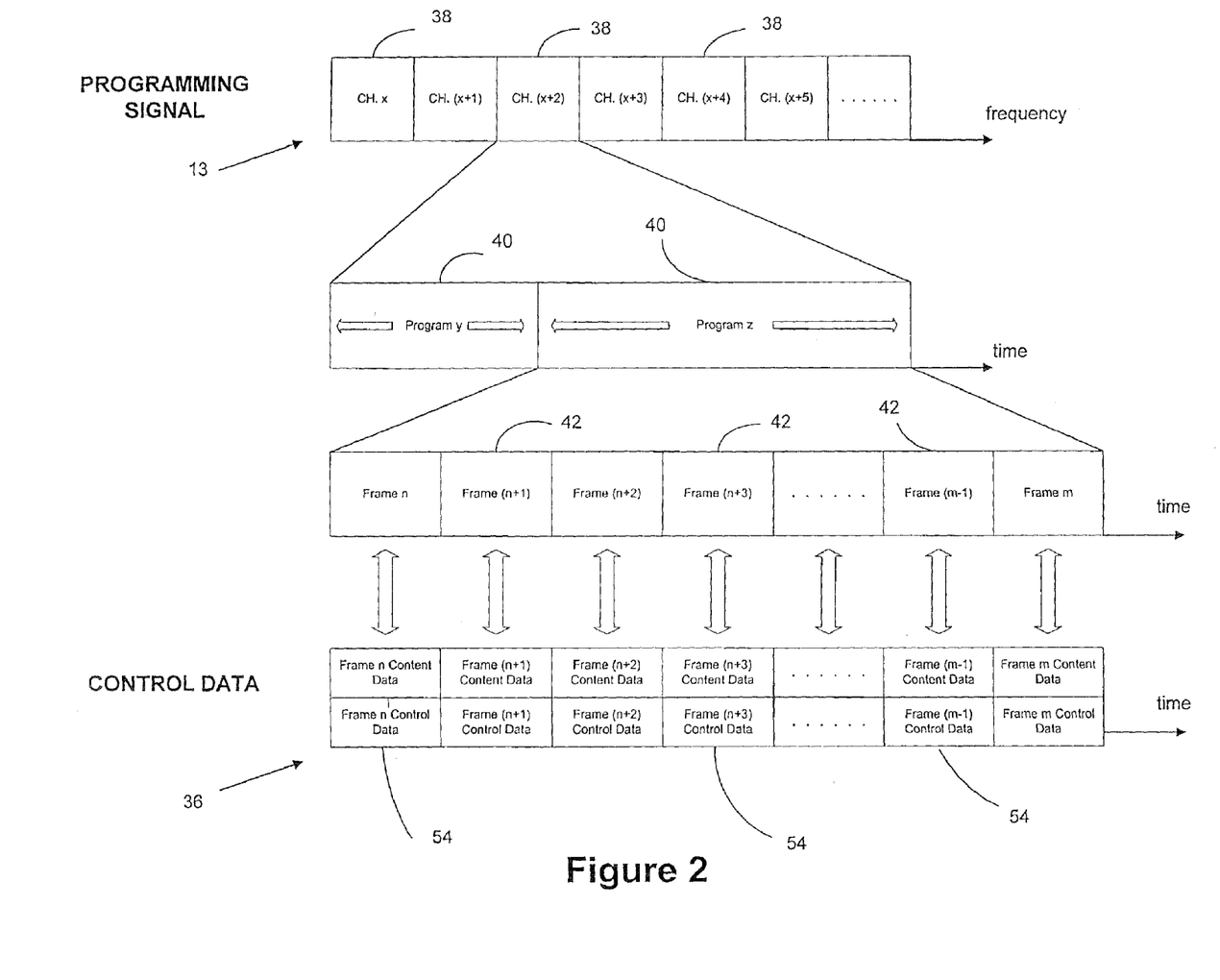
FIG. 2 is a diagram illustrating one potential format of a programming signal and corresponding program data according to an embodiment of the present invention.

As shown in FIG. 2, signal 13 carries multiple channels 38, each occupying a different portion of a frequency spectrum of signal 13. Transmission facility 12 may provide program viewers 18 with different programs 40 throughout the day on each channel 38. Each program 40 may be divided into multiple consecutive data frames 42, each of which contains all of the data related to the presentation of program 40 for a particular time interval.

In addition to providing program viewers 18 with program data 42 for each program 40, transmission facility 12 also provides program viewers 18 with program data 36 for each program 40. Data 36 is information associated with program data 42 comprising program content data, program control data, or both. As shown in FIG. 2, data 36 may be divided into multiple consecutive data frames 54 corresponding to data frames 42 of program 40. Program content data may be information related to rating and/or content attributes, such as MPAA ratings, TV Parental Guidelines ratings, or any other rating system. Program control data may be information related to the manner in which program data 42 may be edited, substituted, deleted, or otherwise altered. For instance, in situations where program data 42 may be substituted, program control data may contain information about other channels or streams or other locations where replacement program data are present.

As will be described in more detail below, program viewers 18 may use the information contained in data 36 about programs 40 to control and manage which programs are presented, which portions of programs are presented, and which media components are presented. Data 36 may also be used to control and manage the manner in which programs, portions of programs, and media components of programs and portions of programs are edited, substituted, deleted, or otherwise altered based on the information in data 36 and/or viewer preferences.

III. Formulation and Delivery of Data

In accordance with the systems and methods of the present invention, data 36 associated with program data 42 for programs 40 may be formulated by a number of entities. For instance, programming producers may formulate data 36 while producing programming. Alternatively, data 36 may be formulated by data/content providers 14, EPG data providers 16, by the entity supporting transmission facility 12, or by any other entity that has access to programming. An example of a method of formulating alternative programming is one which uses the Internet. Thus, a studio may release a portion or all of a story-line for a series on the Internet and allow users there to "vote" or suggest endings or twists in the plot line. Either before or after receiving such input, the studio may film the most popular of the suggestions and embed these alternative programs into other channels. If the alternatives are filmed first and then selected by viewers of the Internet sight via voting or similar feedback, the site can be linked to the transmission facility and, following tabulation of viewer feedback, the site can automatically instruct the transmission facility to load a particular alternative track. Ultimately, such viewer feed back may be done in real time or virtual real time.

Program data 36 may be provided using many possible data delivery methods, as skilled persons will recognize. The following details several exemplary delivery methods:

Timestamped Delivery: Data 36 may be provided using a timestamped data delivery approach. This approach delivers all data 36 for an entire program either before the program begins or when the user tunes to the program. Timestamps are used to associate particular ratings and/or content attributes data to particular portions of the program. Ideally, this approach works best when presentation control system 26 has or couples to an internal clock that synchronizes to a network clock to assure accurate synchronization of data 36 to the program content.

Batch EPG Delivery: Data used by existing EPGs is often delivered all at once, for example as a batch transmission. A similar approach can be used by which existing EPG data is supplemented with program data 36. Specifically, as shown in FIG. 1, an EPG data server 22 may receive data 36 from an EPG data provider 16. Alternatively, the data provided by the EPG data server 22 may be enhanced by the addition of data provided by a program data server 26. The transmission facility 12 delivers the resulting data through the distribution network 15 to presentation control system 26 or consumer electronic device 28, 20, 32, or 34.

Streaming Delivery: Data 36 may also be provided using a streaming delivery method. This approach delivers program content data and program control data in real-time along with the program's video and audio content. There is no need for timestamps or clock synchronization since the data delivery is synchronized to the showing of the program. Methods of delivering streaming data include an MPEG private data stream or data insertion into the program's VBI (vertical blanking interval) line.

An advantage of this approach over the timestamped approach described above is that it is not effected by delays in the video content. For example, if a program is delayed because a sporting event that precedes it goes into overtime, the program's timestamped data may no longer be accurate since it was downloaded ahead of time and assumed the program began at a certain time. Program viewer 18 may tune to the program while in progress.

Data 36 would have to be repeatedly retransmitted during the period for which it was valid because presentation control system 26 or consumer electronic device 28, 30, 32, or 34 may not know what the last data values were when tuning to a program. Ideally, the retransmission interval should not be more than once a second.

Regardless of the delivery vehicle, in operation, program viewers 18 receive signal 13 and data 36 from transmission facility 12. As described above, data 36 may be included within signal 13 as another channel within the frequency spectrum or may be received as an independent data stream or as a periodic download. In situations where data 36 is received in the form of a periodic download before programs are viewed, data 36 may be stored in memory by system 26. In alternative embodiments, data 36 may be supplied to program viewers 18 as part of a broadcast television signal in the vertical blanking interval. Data 36 may also be supplied by other service providers using communications network 15 or any other suitable communications network. Data 36 may also be received via any public or private packet-switched or other data networks including the Internet, circuit switched networks such as the public switched telephone network, wireless networks, or any other desired communications infrastructure.

IV. Data Formatting

Skilled persons will recognize several methods of formatting program content and control data. Co-pending application Ser. No. 60/231,180 discloses certain methods for formatting data tags into EPG data. Other methods are described below.

Figure 4:
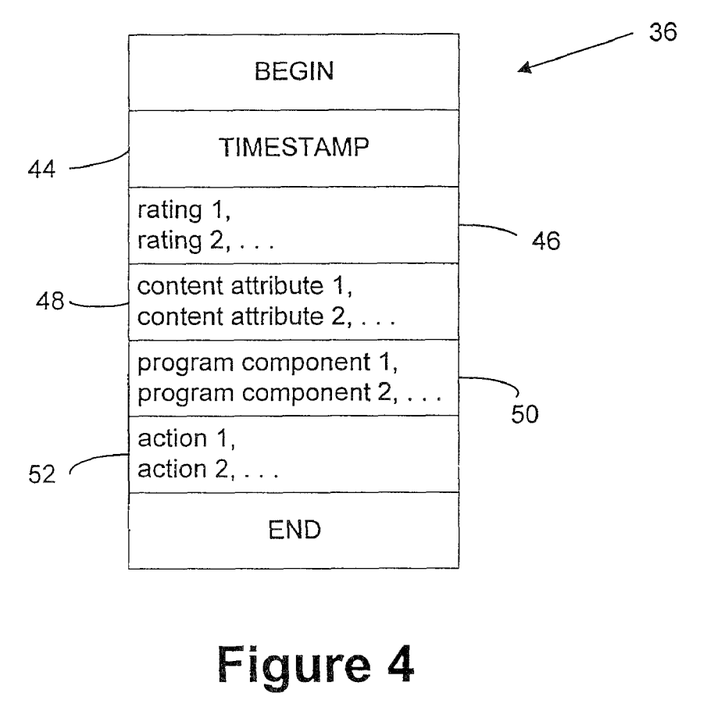
FIG. 4 illustrates an exemplary format for the data illustrated in FIGS. 2 and 3 according to an embodiment of the present invention.

Data 36 provides program viewers 18 continuous information related to the content of programs 42 throughout the entire presentation. As shown in FIG. 4, data 36 may have a data structure comprising:

(1) program content parameters, such as: timestamp 44, rating 46, content attribute 48, program component 50, and any other suitable parameter for identifying the content of program data 42 and (2) program control parameters, such as: control instruction or action 52 or any other suitable parameter associated with the manner in which program data 42 may be edited, substituted, deleted, or otherwise altered.

Timestamp 44 associates program content and program control data with a particular time interval within a program 40. The time interval may be represented as an offset from the start of program 40 and may be expressed in hours, minutes, and seconds or in any smaller unit of time, such as the length of a video frame.

The remaining parameters are used to define desirable control and management parameters for the corresponding time interval. For example, rating 46 may be a value associated with a ratings system, such as the TV Parental Guidelines ratings system, the MPAA ratings system, or any other standard ratings systems. Alternatively, rating 46 may be values associated with multiple ratings systems. Content attributes 48 may be a value associated with a trait or attribute of program 40. Content attribute 48 may be based on the content rating system employed by the TV Parental Guidelines or MPAA rating system. Content attribute 48 may be a value indicating the existence of certain attributes or traits in a particular time interval of program 40, such as violence (V), sexual situations (S), coarse or crude indecent language (L), suggestive dialogue (D), fantasy violence (FV), or any other defined attribute or trait. A better approach than using the fairly simplistic content attributes associated with the existing TV ratings system (L, V, FV, S, D) would be to use a system that assigns numeric values to each of the content attributes depending on the degree of attributes present. For example, Violence (V) could be rated on a scale of 1-5 during the course of a program. Such ratings provide viewers with finer control over the level of violence blocked or modified. Program components 50 may be used to identify the media component of program rating 46 and/or content attribute 48 apply. For example, program component 50 may indicate that rating 46 or content attribute 48 apply only to the video component, only the audio component, or both the video and audio components. Program component 50 may also be used where program 40 contains multiple audio and/or video streams within the same channel 38, in which case the data may indicate to which stream or streams rating 46 or content attribute 48 apply. Program control parameters, such as control instructions or actions 52, may be a value associated with the various ways in which program 40 may be blocked, disabled, modified, replaced, and/or edited. For instance, the following table I illustrates an example of possible control instructions and their corresponding functions supported by data 36.

TABLE I

Program Control Data

| Control Value | Control Function |
|---|---|
| BV | block video |
| BA | block audio |
| BVA | block video and audio |
| BP | block only a portion of the video display |
| SLA | substitute local audio |
| SLV | substitute local video |
| SAS | substitute alternative audio stream |
| SVC | substitute alternative video channel/stream |
| SAVC | substitute alternative video and audio channel/stream |
| DS | delete scene |
| SS | substitute different scene |

As shown in FIG. 2, data 36 may also be presented as a timestamped variance from a default setting. Data 36 may associate program 40 with a standard default setting, which is the same for all types of programs 40. Accordingly, only those portions of program 40 that vary from the default setting need to be assigned program content and control data. For example, the default setting may refer to programs that do not have any undesirable content and/or attributes. Using this method, data 36 need only contain information for those time intervals of program 40 that contain content and/or attributes that differ from the default setting and may reduce the amount of information in data 36.

As shown in FIG. 2, data 36 may also be delivered to program viewers 18 in real-time along with program 40. In this implementation, data 36 does not have to include information related to the time interval within program 40 because the two parallel streams are synchronized. Data 36 may comprise a plurality (e.g., more than two) of data frames 54, each corresponding to a discrete time interval of program 40. In this embodiment, data frames 54 may be synchronized with data frames 42 in program 40 such that the time interval associated with each is equal. Alternatively, the time interval associated with control data frames 54 may vary from that of data frames.

V. Exemplary Data Format

An example of a possible data format for dynamic ratings and content attributes is shown below in Table II.

TABLE II

DEFAULT [rating1, rating2, . . .]; [, content1, content2, . . .]
Timestamp [rating1, rating2, . . .]; [, content1, content2, . . .]
[component] [action]
Timestamp [rating1, rating2, . . .]; [, content1, content2, . . .]
[component] [action] . . .

In this example: DEFAULT indicates a set of overall ratings and content attributes for the program. These overall ratings and content attributes would be similar to the ones already provided by many existing EPGs and other parental control systems.

"Rating" is a value associated with a ratings system such as the TV rating system or MPAA rating system. However, other rating systems are possible and could be used. A program could have ratings from more than one rating system. Also, the program's rating value for a particular rating system could be missing or NULL since not all programs are rated.

"Content" is a value associated with a content attribute system (the word "traits" is sometimes used instead of "content") such as the ones associated with the TV rating system (V,S,L,D,FV) or MPAA rating system (e.g. Nudity, Violence, etc.). However, other content attribute schemes (such as the multi-level scheme proposed above) are possible and could be used. A program could have multiple content attributes from multiple content attribute systems.

"Timestamp" indicates when the associated ratings, content attributes, and actions begin. Ideally, the timestamp should be an offset from the start of the program. The timestamp could be expressed in hours, minutes and seconds (e.g. hh:mm:ss). A way should exist to subdivide seconds into a smaller unit of time such as frames (1/30 second).

"Component" refers to the part of the program to which the ratings and content attributes apply, such as audio, video, or both. "Component" may also refer to substitute channels, streams, or other locations of substitute audio and/or video. If a component value is not specified, both video and audio are assumed.

"Action" indicates ways in which the program could be modified to nullify the portion of the program with the given ratings and/or content attributes. For instance, an action could instruct the presentation control system 26 to perform any of the functions described above in Table I.

Table III illustrates how this data format could be used to deliver program data 36 using the timestamped delivery approach described above. This example uses the existing MPAA ratings system (G,PG,PG-13,R,NC-17) and the content attributes associated with the TV ratings system (L=Language, V=Violence, S=sexual situations, D=suggestive dialog, FV=fantasy violence).

TABLE III

Example of Program Data 36

DEFAULT R; L, V, S
00:00:00:00 G
00:11:15:02 R; L audio changeto 14
00:11:16:11 G
00:24:45:00 R; V, S
00:24:45:30 PG-13; V video
00:24:46:00 G
00:32:01:00 R; S video mosaic 20, 100, 30, 150
00:32:05:00 G
. . .

Table III shows where the content data has been formulated into a series of data records, each record associated with a particular portion of the programming. Thus, in this example:

"TV-MA; L,V,S" are the default ratings and content attributes for the entire program. These are similar to existing rating systems that use generalized ratings and content attributes for the entire program.

"00:00:00:00 G" is the first timestamp offset and first rating for the program. These values indicate that at the start of the program, the program contains material rated G and there are no content attributes present. If no ratings/content values are specified for the beginning of the program, the default ratings/content values should be used.

"00:11:15:02 R; L audio changeto 14" is the second timestamp offset. These values indicate that 11 minutes, 15 seconds, and 2 frames from the start of the program, the programs rating has changed to "R" and the show now has a content attribute "L" which indicates coarse "Language". The "audio" value indicates that the rating is only associated with the audio portion of the program. "Changeto 14" indicates that an alternative audio track exists for that portion of the dialog. For the purposes of this example, assume that a character in the program has uttered a brief vulgarity. In this case, at the offset shown, presentation control system 36 may switch to an alternative audio track if the ratings and content attributes equal or exceed those indicated by the user's parental control settings. At the next timestamp, presentation control system 26 would reset the audio settings to those indicated by the next ratings/content data.

"00:11:16:11 G" indicates that the rating is back to G. Any blocking that resulted from the previous timestamp can be reset. Using the example above, the character has stopped uttering the vulgarity and the audio can be returned to normal.

"00:24:45:00 R; V,S" indicates that the rating has changed to R and there is now "Violence" and "Sexual Situations". The lack of any component value or action value indicates that both video and audio should be blocked (disabled) if the ratings/content values equal or exceed the user's parental control settings.

"00:24:45:30 PG-13; V video" indicates that the rating has changed to PG-13 and there is now only Violence (V). The Sexual Situations (S) have stopped. The "video" component value indicates that video should be blocked if the ratings/content values equal or exceed the user's parental control settings.

"00:24:46:00 G" indicates that the rating has returned to G. Turn off any blocking or modifications that resulted from the previous timestamp.

"00:32:01:00 R; S video mosaic 20,100,30,150" indicates that the rating is now R and there is a sexual situation (S). Let's assume there is some nudity on the screen. The component "video" indicates that only the video should be effected and the action "mosaic 20,100,30,150" indicates a mosaic effect may be used to blur the screen at the indicated coordinates.

"00:32:05:00 G" indicates that the rating is back to G. Turn off any blocking or modifications that resulted from the previous timestamp.

Figure 3:
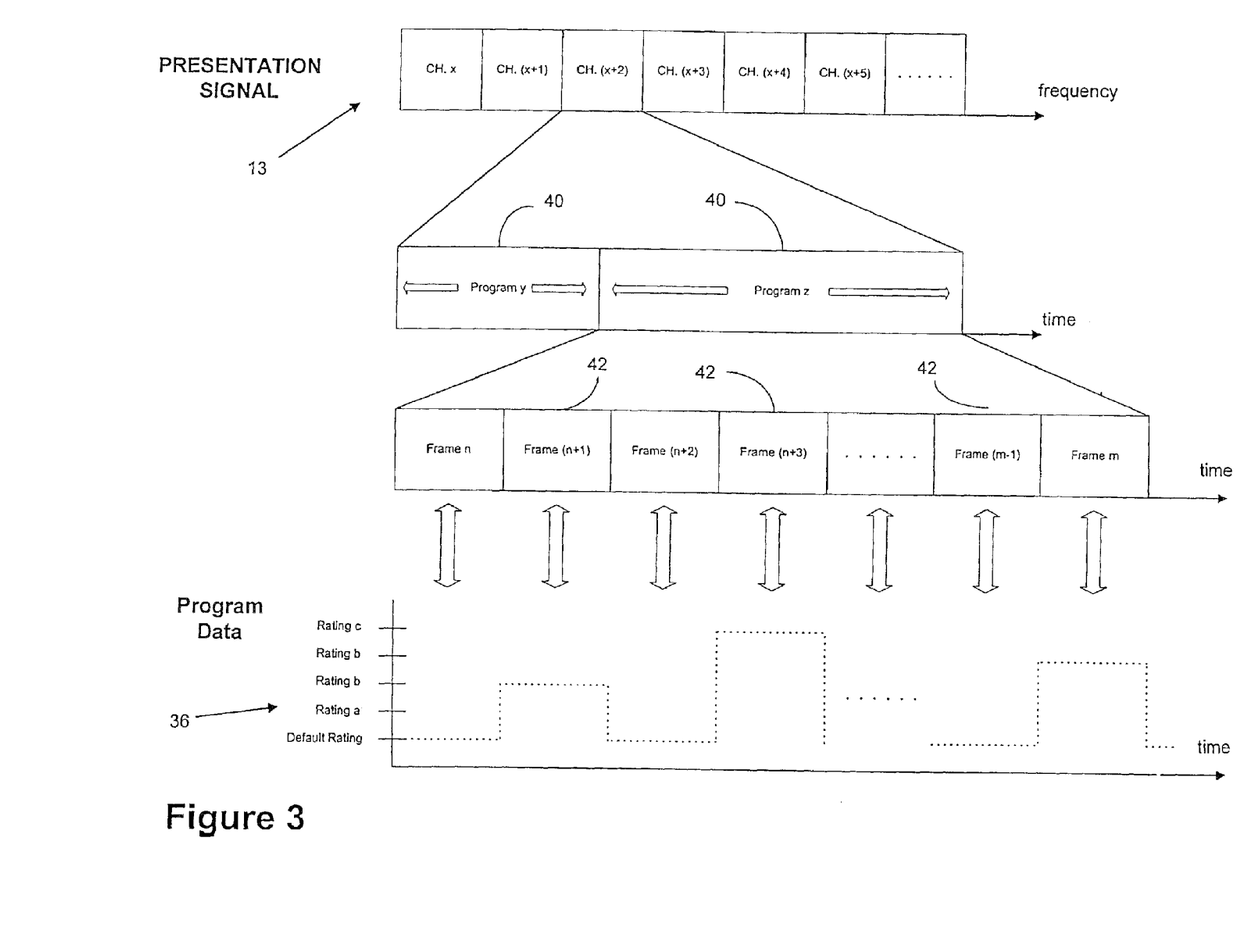
FIG. 3 is a diagram illustrating another potential format of a programming signal and corresponding program data according to an embodiment of the present invention.

In the above example, if the streaming delivery approach was used, the "Timestamp" attribute would not be needed. As shown in FIG. 3, program data 36 would have to be retransmitted at some interval while the data is valid to accommodate users who tuned to a program in progress. Delivered data can also be buffered for retrieval.

If program data 36 is batch delivered to presentation control system 26, an applet at the CE device or set top box associated with the user's display device may scan all of data 36 in advance to determine how often blocking would occur during the program. If implementing the user's presentation profile 35 based on the received program data 36 would cause an unacceptably high amount of blocking or modification (e.g., in terms of amount of time program is blocked or percentage of program blocked), the entire program could be blocked or the user informed and allowed to change the rating. The user may select the threshold at which this decision is made as part of the user's input of presentation profile 35 data.

VI. Viewer Presentation Profile

Figure 6:
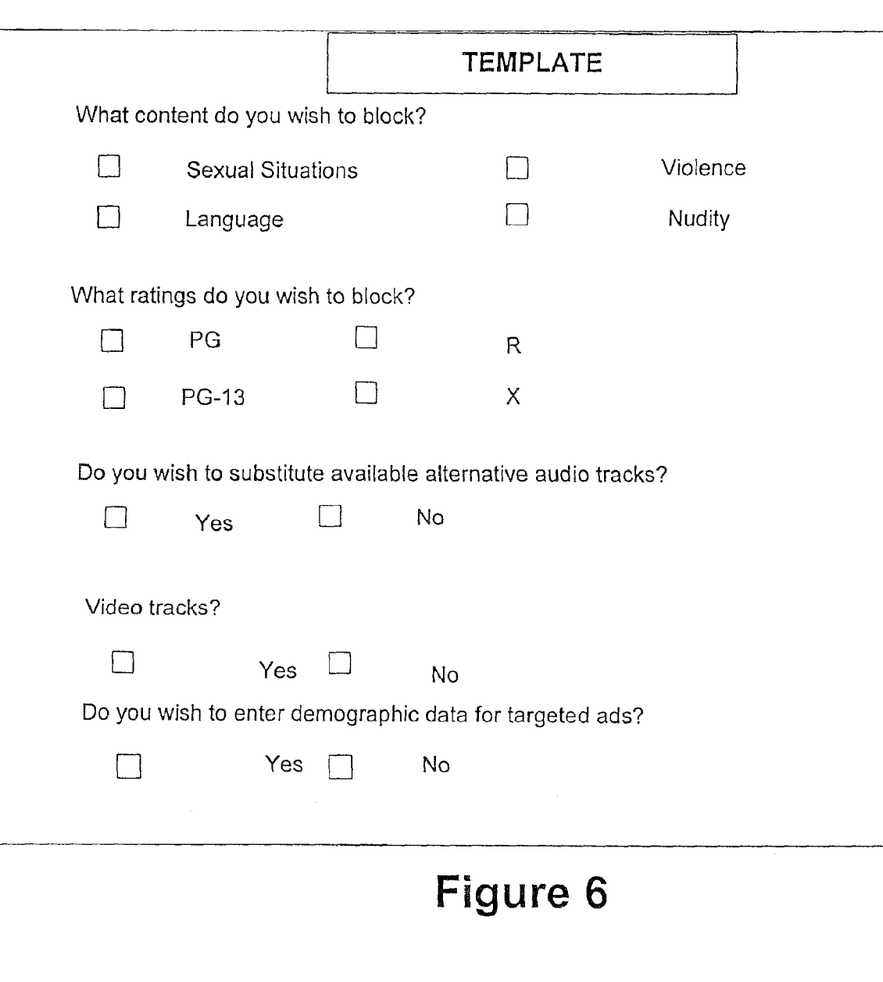
FIG. 6 is an exemplary menu screen of a program viewer interface according to the present invention.

With reference to FIG. 6, system 26 may include a viewer interface by which viewer 18 inputs a presentation profile 35 containing instructions for controlling programming to be displayed and the format thereof. The presentation profile 35 that viewers may create allows more flexibility in using system 26 for controlling and managing programming. Viewer interface 58 and a template 59 allow viewers to enter data stored in a profile 35 that then operates with application program 60. The viewer interface 58 may be a standard remote control, a wired or wireless keyboard, control buttons on the CE device implementing system 26, infrared port, PDA port or other suitable communication device for communicating commands to the application program 60. By these viewer interface 58 devices or software, such as a viewer interface applet or the like, viewers can input information, such as information called for by template 59, into the CE device so that application 60 can populate a memory or other storage device with the users' presentation profile 35. Application program 60 enables program viewers 18 to interact with the template 59 and television 28 using a standard menu system to populate the presentation profile 35 with the appropriate data.

For instance, viewer 18 may configure system 26 permanently or temporarily to disable certain channels 38 in order to block undesired programming. In other words, application 60 running on a set top box or other CE device allows the user to turn parental controls on or off and indicate what ratings or content should trigger those controls. For example, if the user set the ratings level to R, all material with a rating of R or higher would be blocked or modified, as depicted in Table IV below

TABLE IV

| MPAA Rating | Status |
| --- | --- |
| X | BLOCKED |
| NC-17 | BLOCKED |
| R | BLOCKED |
| PG-13 | Open |
| PG | Open |
| G | Open |

In addition to ratings, however, users may modify discrete programming portions having certain attributes. For example, if content attributes associated with the TV ratings system were used, viewers may indicate which of the following content attributes should be blocked or modified, as per Table V below in which the user blocks "Sexual Situations", "Suggestive Dialog" and "Language" content.

TABLE V

| TV Content | Status |
| --- | --- |
| V (Violence) | |
| L (Language) | BLOCKED |
| S (Sexual Situations) | BLOCKED |
| D (Suggestive Dialog) | BLOCKED |
| FV (Fantasy Violence) | |

Additionally, the system offers users the ability to block ratings or content attributes in several different ways. Specifically, the user could choose from the following blocking options for each rating level and content attribute:

Block the Entire Program. This would allow the user to use traditional parental blocking where the entire program is blocked if the overall (DEFAULT) rating or content attributes equal or exceed those set by the user. In this case, the dynamic ratings/content data would have no effect, only the DEFAULT ratings/content data would be used.

Block Portions. This would use dynamic ratings/content data to block video or audio that equals or exceeds the corresponding parental control settings. The DEFAULT ratings/content information would not be used, unless the dynamic ratings/content data was missing. With this option, modification of the program's content would not be allowed and any instructions to modify the program would be interpreted as an instruction to block the video or audio.

Block or Modify Portions. This would allow portions of the program's video or audio to be blocked or modified as indicated by the program's ratings/content data. The DEFAULT ratings/content information would not be used, unless the dynamic ratings/content data was missing.

These options could be applied to individual ratings and content attributes. For example, the user could set blocking for content attributes as shown in Table VI:

TABLE VI

| TV Content | Status |
| --- | --- |
| V (Violence) | |
| L (Language) | BLOCK OR MODIFY PORTIONS |

TABLE VI-continued

| TV Content | Status |
| --- | --- |
| S (Sexual Situations) | BLOCK ENTIRE PROGRAM |
| D (Suggestive Dialog) | BLOCK PORTIONS |
| FV (Fantasy Violence) | |

In this example, a program that had any sexual situations (as indicated by the overall ratings/content data) would be blocked in its entirety. Portions of the program with suggestive dialog (S) would be blocked, and portions of the program with language (L) would be blocked or modified.

Table VII below shows a further example using a different, MPAA ratings system:

TABLE VII

| MPAA Rating | Status |
| --- | --- |
| X | BLOCK ENTIRE PROGRAM |
| NC-17 | BLOCK ENTIRE PROGRAM |
| R | BLOCK OR MODIFY PORTIONS |
| PG-13 | |
| PG | |
| G | |

Even more detailed parental control settings are possible. For instance, viewer 18 could choose to allow audio to be modified but not video, forcing video to always be blocked. Or, viewer 18 may select any of the following disabling methods: complete block, partial block, substitution from local device, substitution from service provider (alternate channel), and substitution from service provider (alternate stream), and local edit.

In yet another aspect of this invention, viewers may add additional, demographic data to their presentation profile. The viewer may indicate the viewer's household income, number of children, ages, gender, etc. This demographic data, as explained in applicant's concurrently filed application entitled, "Methods for Displaying Programming Content Based on User's Demographic Data, Usage Data and/or Commands," which application is hereby incorporated in its entirety by this reference, may be used by an applet running on the viewer's system 26 to select a particular program or advertisement targeted to viewers with a predetermined demographic profile.

VI. Use of Program Data

Figure 5:
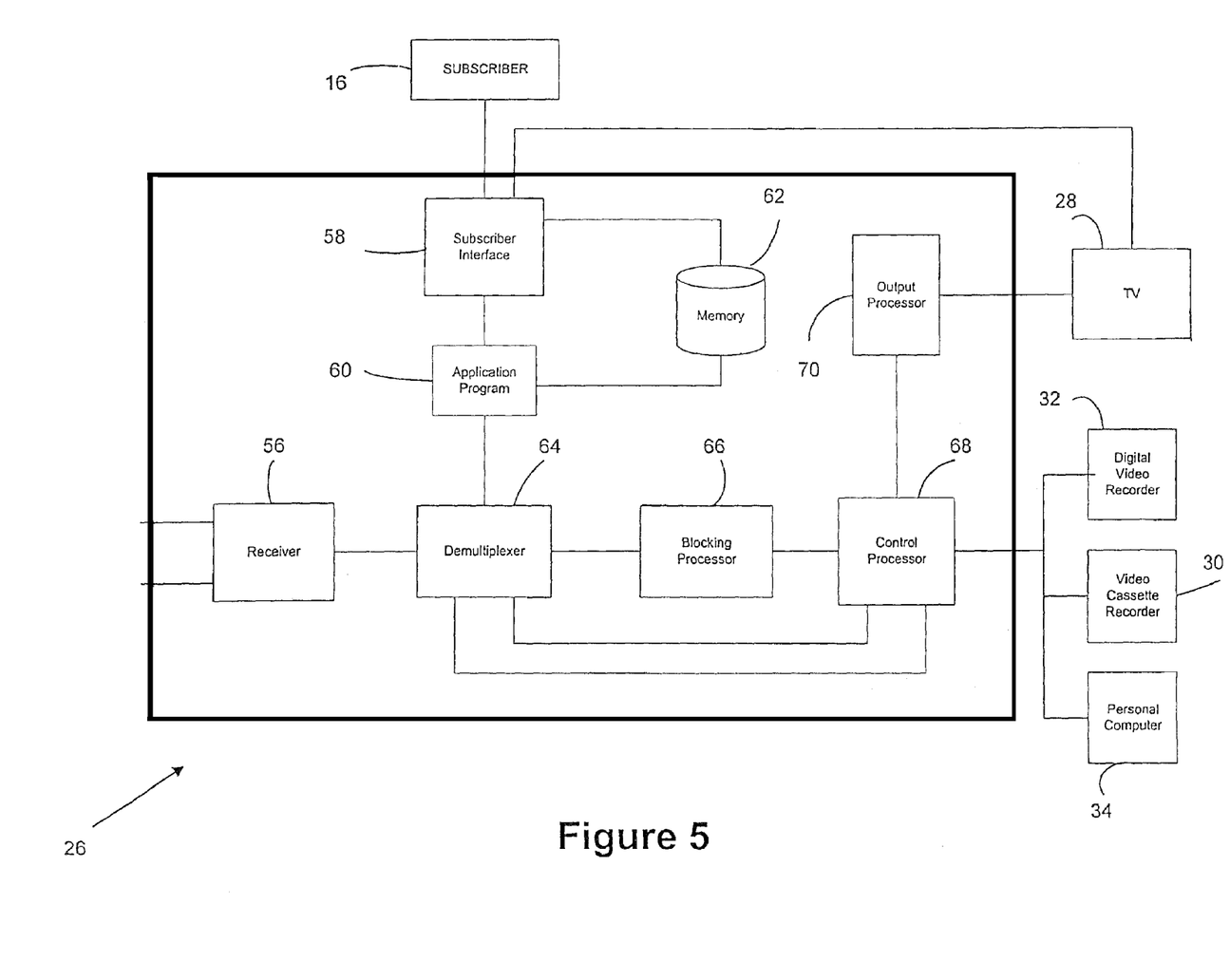
FIG. 5 is a diagram illustrating a presentation control system according to the present invention.

FIG. 5 shows at least portions of a system 26 for controlling and managing the presentation of programming received via signal 13 based on data 36. The consumer electronics device that resides in a viewer's home and implements the system 26 can be provided with a blocking processor 66 adapted to communicate with a memory 62, a demultiplexer 64, and a control processor 68. Skilled persons will recognize that processors 66, 68 can be actual microprocessors or simply different portions of a single processor devoted to different tasks. Processor 68 (1) controls various components like tuner 64, blocking processor 66, signal processor 70 and (2) communicates with one or more consumer electronic devices, such as VCR 30, DVR 32, personal computer 34, or any other suitable consumer electronics or home theater and/or entertainment device. An output signal processor 70 outputs video and audio signals to television 28 or any other suitable display device. Skilled persons will recognize that these hardware components—which could be combined into one component—may be found in or added to traditional set-top boxes or consumer electronic devices and need merely be reprogrammed with the functionality described herein.

In any event, in controlling programming content, system 26 acts on (1) program data 36 that has both content and control data, (2) presentation profile 35, or (3) a combination of the program data 36 and presentation profile 35. Examples of each of these are given below:

A. Filtering Operations

Figure 7:
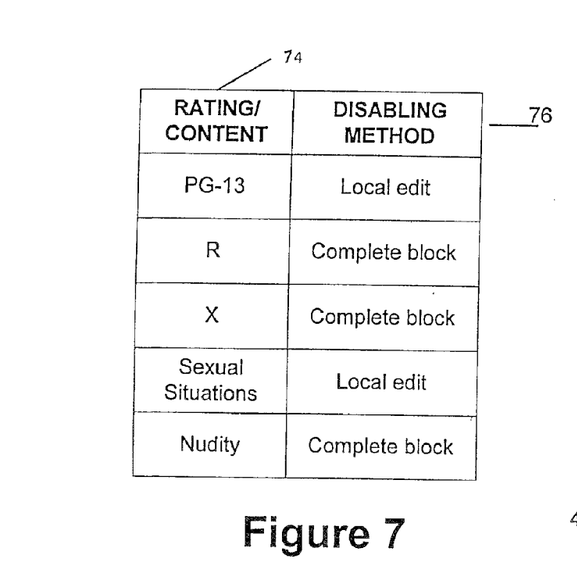
FIG. 7 is an example of a presentation profile shown in FIG. 7 according to the present invention.
Figure 8:
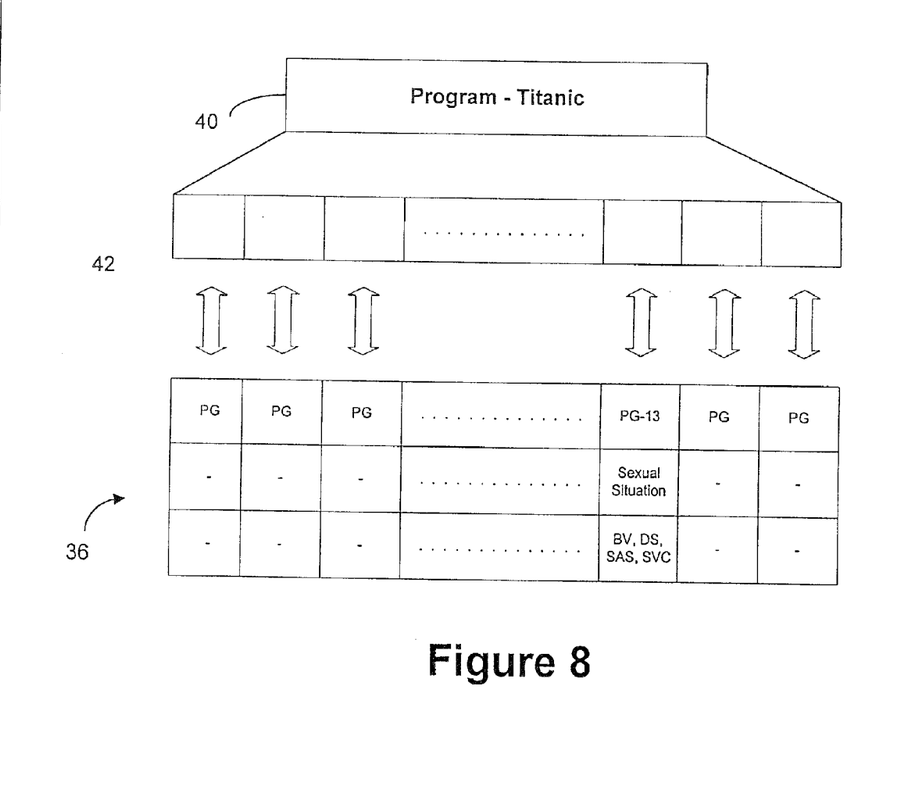
FIG. 8 is a diagram illustrating an example of a program and corresponding program data according to the present invention.

Data 36 is received at the control system 26. A processor, e.g., blocking processor 66, accesses profile 35 from a memory 62 and combines it with data 36 to determine if and how program 40 should be presented. As seen in FIGS. 7 and 8, for each time interval of program 40, blocking processor 66 compares data 36 against profile 35 and acts as needed. As described above in detail, data 36 contains information for each time interval of program 40 related to various presentation control and management parameters, such as rating 46, content attribute 48, program component 50, control instruction 52. Profile 35 contains a list of rating/content attributes 74 that viewer 18 does not want to be presented and the corresponding disabling method 76.

For example, referring to FIGS. 4 and 7, a blocking processor 66 compares rating 46 and content attribute 48 values in data 36 with the rating/content attributes 74 in profile 35. If data 36 does not contain any rating/content attributes listed in profile 35, blocking processor 66 does not send any control instructions to control processor 68. Under these circumstances, control processor 68 then forwards channel 38 from demultiplexer 64 to output processor 70 where it may be presented on television 28. On the other hand, if data 36 contains a rating/content attribute listed in profile 35, blocking processor 66 then determines applicable instruction 76. Depending on the particular combination of program component 50 values in data 36 and disabling method listed in profile 35, blocking processor 66 may send any of the control instructions 52 mentioned above and shown in Table I to control processor 68. Implementation or exemplary instructions is described below:

Blocking processor 66 sends "block video" control instruction if viewer 18 selects the "partial block" disabling method per instruction 76 and program component 50 is "video."

Blocking processor 66 sends a "block audio" control instruction if viewer 18 selects the "partial block" disabling method per instruction 76 and program component 50 is "audio."

Blocking processor 66 sends a "block video and audio" control instruction if viewer 18 selects the "complete block" disabling method per instruction 76 regardless of the program component 50.

In response to any of these instructions from blocking processor 66, control processor 68 performs the appropriate signal processing to edit the signal in channel 38 received from demultiplexer 64 and then forward the edited signal to output processor 70 for presentation on television 28.

B. Editing Operations

In accordance this invention, programming may also be dynamically edited based on the viewer's presentation profile 35. For instance, blocking processor 66 sends a "block portion of video" control instruction if viewer 18 selects the "partial block" disabling method 76 and program component 50 is "video." Thereafter, processor 68 may modify the signal in order to blank or blur the affected portion of the video display or may overlay the affected portion with any desirable text or other message. After completing signal processing, control processor 68 forwards the signal to output processor 70 for presentation on television 28.

Alternatively, other programming content, ranging from audio, to video, to Web pages or combinations thereof, may be substituted for the undesired programming portion. For instance, blocking processor 66 sends a "substitute local audio" control instruction if viewer 18 or the transmission facility 12 has selected the "substitution from local device" disabling method per instruction 76 and program component 50 is "audio." In response to this instruction from blocking processor 66, control processor 68 performs the appropriate signal processing to block the audio component of channel 38 received from demultiplexer 64. Control processor 68 then initiates a communications link with (a) a different channel having the substitute audio or (b) the desired local device, such as memory 62, DVR 32, VCR 30, personal computer 34, or any other suitable device capable of providing audio, from which the substitute audio is to be received. After receiving the substitute audio, control processor 68 performs the appropriate signal processing to combine the substitute audio with channel 38 and then forwards the combined signal to output processor 70 for presentation on television 28.

Other commands such as substitute video, substitute local video, substitute video from memory 62, switch channel, display Web page, etc. may be implemented by the processors 66, 68 in similar fashion. Note that alternate content may be provided from transmission facility 12 as part of the original signal 13, either in the form of alternate channels 38 or alternate streams within a channel 38. Program 40 on channel 38 may comprise a plurality of audio streams and a plurality of video streams, as well as a plurality of alternate audio streams and a plurality of alternate video streams. In this way, there may be an alternate stream according to each rating/content attribute category. In these situations, the transmission facility 12 includes within the data 36 information concerning the channel or URL to which the system 26 should tune for the alternate content. Alternatively, the alternate content may also be provided by a service provider other than the service provider supplying signal 13.

Referring to FIGS. 8 and 9, the systems and methods of the present invention will now be described with reference to a particular example. Suppose a particular viewer desires to view a program 40 containing the movie Titanic. As shown in FIG. 9, suppose the viewer has configured a profile 35 to completely block any programming content or portions of programming content containing nudity or associated with a rating of R or X and to perform a local edit for portions of programming content rated PG-13 and containing sexual situations. Also, as shown in FIG. 8, suppose the movie Titanic has been divided into multiple consecutive data frames 42 for each discrete time interval for the duration of the movie.

Recall from above, the movie Titanic would have been rated PG except for the short love scene between the two main characters. Thus, prior to the present invention, a viewer that desired not to view programming rated PG-13 would not have been able to view any portion of Titanic. The present invention solves this problem. For example, in the present invention data 36 associated with each portion of Titanic is also provided to the viewer. Data 36 comprises rating data, content attribute data, and control instructions. As shown in FIG. 9, each data frame associated with Titanic was rated PG and had a general content rating except for the data frame associated with the love scene. This data frame was rated PG-13 because of the sexual situation. In this circumstance, where profile 35 was configured to perform a local edit on content rated PG-13 and containing sexual situations, the systems and methods of the present invention enable the program viewer to view each portion of the movie except the portion rated PG-13 and containing the sexual situation. In addition, because profile 35 was configured for "local edit", the systems and methods of the present invention enable the program viewer to edit out the undesirable portion using DVR 32.

VII. Other Features and Embodiments

Other features may be programmed into the control system 26 that may reside on the CE device or set top box coupled to a display device. For instance, it may not be immediately apparent to viewers whether the control system 26 is in effect when they initiate the display device and tune to a program. On screen indicators may be used to indicate the status of the controls (e.g., an icon may display or a message like "All programming with ratings above PG-13 have been blocked."). Likewise, during modification of the programming content, an icon may indicate to the user that the content has been edited or deleted.

PIN entry or other security protocols can be implemented by system 26 to allow valid users to initiate, modify or disable the controls. Correct PIN entry shows the programming in its unmodified form. Programming controls can be reinstated when the user tunes to another channel or turns off the Set Top Box or CE device.

While this invention has been described in conjunction with specific embodiments, it is evident that many alternatives, modifications, and variations will be apparent to those skilled in the art. Accordingly, the preferred embodiments of the present invention described are intended to be illustrative and not limiting. Various changes may be made without departing from the true spirit and full scope of the invention as defined in the following claims.

What is claimed is:

1. A method, comprising:
receiving a program, a default rating of the program, and dynamic ratings of portions of the program;
receiving a preference from a profile to modify a scene in the program;
determining by a processor that a dynamic rating is missing for one portion of the portions of the program;
disallowing modification of the scene in the program in response to determining the dynamic rating is missing;
receiving at the processor an instruction to modify the scene in the program; and
interpreting, by the processor, the instruction to modify the scene as blocking the one portion of the program from presentation.

2. The method according to claim 1, further comprising blocking the program in response to the default rating exceeding a parental control.

3. The method according to claim 1, further comprising blocking any portion of the program when any dynamic rating exceeds a parental control.

4. The method according to claim 1, further comprising retrieving demographic data from the profile.

5. The method according to claim 4, further comprising selecting an advertisement targeted to the demographic data.

6. The method according to claim 1, further comprising blocking the dynamic ratings of the portions of the program.

7. The method according to claim 1, further comprising modifying any portion of the program when the dynamic rating exceeds a parental control.

8. The method according to claim 1, further comprising blocking a channel carrying the program.

9. The method according to claim 1, further comprising disabling a channel carrying the program.

10. A system, comprising:
a processor; and
memory storing instructions that when executed cause the processor to perform operations, the operations comprising:

receiving a program, a default rating of the program, and dynamic ratings of portions of the program;

receiving a preference from a profile to modify a scene in the program;

determining one of the dynamic ratings is missing for one portion of the portions of the program;

disallowing modification of the scene in the program in response to determining the dynamic rating is missing;

receiving an instruction to modify the scene in the program; and interpreting the instruction to modify the scene as blocking the one portion of the program from presentation.

11. The system according to claim 10, wherein the operations further comprise comparing the default rating of the program to the dynamic ratings in response to the missing dynamic rating.

12. The system according to claim 10, wherein the operations further comprise comparing blocking an audio portion of the program.

13. The system according to claim 10, wherein the operations further comprise ignoring the default rating of the program in response to presence of the dynamic ratings.

14. The system according to claim 10, wherein the operations further comprise blocking the program when the default rating exceeds a parental control.

15. The system according to claim 10, wherein the operations further comprise blocking any portion of the program when any dynamic rating exceeds a parental control.

16. The system according to claim 10, wherein the operations further comprise retrieving demographic data from the profile.

17. The system according to claim 10, wherein the operations further comprise selecting an advertisement targeted to the demographic data.

18. The system according to claim 10, wherein the operations further comprise blocking the dynamic ratings of the portions of the program.

19. The system according to claim 10, wherein the operations further comprise blocking a channel carrying the program.

20. A memory storing instructions that when executed cause a processor to perform operations, the operations comprising:

receiving a program, a default rating of the program, and dynamic ratings of portions of the program;

receiving a preference from memory to modify a scene in the program;

determining a dynamic rating is missing for one portion of the portions of the program;

disallowing modification of the scene in the program in response to determining the dynamic rating is missing;

receiving an instruction to modify the scene in the program; and interpreting the instruction to modify the scene as blocking the one portion of the program from presentation.

* * * * *